Patented Oct. 23, 1945

2,387,499

UNITED STATES PATENT OFFICE 2,387,499

STABILIZATION OF POLYISOBUTYLENE

William J. Daly, Brooklyn, N. Y., assignor, by mesne assignments, to Jasco, Incorporated, a corporation of Louisiana No Drawing. Application June 19, 1943,
Serial No. 491,565

15 Claims. (Cl. 260—93)

This invention relates to olefinic polymer substances; relates particularly to means for stabilizing olefinic polymers against molecular weight breakdown during heating and storage, and relates especially to the use of amines in the polymers for preventing or minimizing the loss of molecular weight of the polymer from the effects of heat and mechanical working.

It has been found that isobutylene, either alone or in admixture with various other olefinic substances, especially the diolefins, can be polymerized readily into high molecular weight polymeric substances having a molecular weight ranging from 10,000 to 250,000 or higher. Such substances, especially when the molecular weight is above 15,000 to 25,000 or 27,000 are plastic, elastic substances having many of the physical characteristics of crude rubber, especially the higher molecular weight forms of polymers. These materials have many important commercial uses due to the high molecular weight, and it is, therefore, highly desirable that the molecular weight obtained during the polymerization should be maintained through subsequent processing and storage. For this purpose, various substances have been suggested as means for minimizing the breakdown, such substances including tertiary amyl phenol sulfide and its homologues and analogues and elemental sulfur. However, the tertiary amyl phenol sulfide is somewhat poisonous and somewhat irritating to the skin, and in addition it interferes somewhat with the vulcanization reaction when a polymer of isobutylene and a diolefin containing it is compounded with rubber. Similarly, sulfur is objectionable because of its solid character and low solubility either in the polymer or in solutions of the polymer.

The present invention utilizes a new and valuable substance which is non-poisonous and soluble, which practically wholly prevents loss of molecular weight in the polymer substance during milling, storage and other processing. This substance is parahydroxy phenyl morpholine, which when present in small proportions has a marked and valuable stabilizing effect upon the molecular weight of the polymer.

Thus the invention consists of the process and product of and from the mixing of an olefinic polymer with a morpholine derivative; and an object of the invention is to preserve, maintain and increase the molecular weight of an olefinic polymer by the admixture therewith of a morpholine substance. Other objects and details of the invention will be apparent from the following description.

In practicing the invention, an olefinic substance, preferably an iso-olefin such as isobutylene is mixed with a refrigerant or with a refrigerant-diluent and polymerized at low temperature by the action of a halide catalyst of the Friedel-Crafts type such as boron trifluoride; or a solution of aluminum chloride; or other appropriate metal halide in an alkyl halide. The polymerization reaction proceeds rapidly to produce a high molecular weight substance which may have a molecular weight ranging from 10,000 to 250,000 or above. The polymer is then washed to remove the catalyst, and is compounded with a morpholine substance such as parahydroxy phenyl morpholine. When so compounded, the material maintains its high molecular weight through subsequent processing, milling and storage, and in addition, the added morpholine substance is non-poisonous to the skin and harmless to most of the subsequent reactions and procedures. The compounding substance may be present in the proportion of 0.01% to approximately 3% depending upon the molecular weight of the polymer and the character of processing to be applied to the polymer. The invention is not limited to the simple polymers of iso-olefins nor to the simple polymer of isobutylene, but applies also to interpolymers of aniso-olefin and a diolefin such as isobutylene with butadiene or with isoprene or with di-methyl butadiene, etc., in which instance it does not interfere with the subsequent processing, compounding and sulfurization procedures applicable to such interpolymers.

This polymerization procedure may be conducted over a wide range of low temperatures beginning at approximately 0° C., particularly advantageous temperatures being found at —10° C. for the production of a moderately high molecular weight polymer; at —40° C. for the production of a superior polymer; at —78° C. as set by the presence of solid carbon dioxide for the production of a particularly desirable polymer; at —98 to —103° C. as set by liquid ethylene either internally in the mixture or externally as a lubricating jacket; to —127° C. or even as low as —164° C. as set by various of the convenient refrigerants.

The raw materials preferably consist of isobutylene as the isoolefin, although several other isoolefins are usable under favorable conditions including such substances as 2-methyl butene-1, or 2,4-methyl butene-1, or the like. The isoolefin may be polymerized alone, or it may be polymerized in admixture with one or more of a wide range of polyolefins having carbon atom numbers per molecule ranging from 4 to about 12 or 14. Particularly advantageous polyolefins are butadiene, isoprene, pentadiene, dimethylbutadiene, myrcene, dimethallyl, and the like, all of which copolymerize satisfactorily with the isobutylene within the indicated temperature ranges.

The polymerization catalyst may be substantially any of the Friedel-Crafts polymerization catalysts as disclosed by M. O. Calloway in his article on "The Friedel-Crafts Synthesis" printed in the issue of "Chemical Reviews," published for the American Chemical Society at Baltimore in 1935, Volume XVII, No. 3, the article beginning on page 327, the list being particularly well shown in the table on page 375. Of the list of Friedel-Crafts catalysts shown by Calloway, boron trifluoride is the preferred catalyst for the production of simple polyisobutylene. For the production of copolymers of isobutylene with a diolefin, the preferred catalyst is a solution of a solid Friedel-Crafts catalyst, such as aluminum chloride or titanium chloride or the like in a low-freezing non-complex-forming solvent. The preferred solvents are ethyl or methyl chloride or carbon disulfide, but substantially any of the mono- or polyalkyl halides having up to about 5 carbon atoms per molecule are useful as are also several other compounds including sulfuryl chloride and the like.

In the preparation of the polymer, the iso-olefin is cooled to the desired low temperature (in admixture with the polyolefin, if one is used) and the catalyst is then added to the cooled mixture. If boron trifluoride is used as the catalyst, it is preferably bubbled through the olefinic mixture. If a dissolved catalyst is used, it is preferably sprayed upon the surface of the rapidly stirred olefin material in the form of fine particles. Alternatively, however, it may be added to the reaction mixture in the form of a liquid which is rapidly stirred in, or in many other ways which will be obvious. The polymerization may proceed immediately and rapidly, as occurs when aluminum chloride dissolved in ethyl or methyl chloride is used; or it may proceed more slowly if other catalysts are used. The solid polymer is then removed from the reaction mixture and brought up to room temperature. It is then desirably washed to remove residual traces of the catalyst substance and any residual unpolymerized materials. The simple polyisobutylene is then useful for many purposes—in its pure form as recovered; or after compounding with a wide variety of other substances, including such materials as polyethylene, natural rubber, and a wide range of inert fillers.

If the polymer is a copolymer containing a substantial proportion of polyolefin, the material shows the valuable property of reactivity with sulfur and a variety of other substances in a curing reaction. For this purpose the material is conveniently compounded with fillers such as carbon black, zinc oxide, stearic acid, sulfur, and a sulfurization aid such as the following recipe:

| | Parts |
|---|---|
| Copolymer | 100 |
| Carbon black | 10 |
| Zinc oxide | 5 |
| Stearic acid | 3 |
| Sulfur | 3 |
| Tuads (tetramethyl thiuram disulfide) | 1 |

This recipe is conveniently prepared upon the open roll mill, and the material after compounding may be placed in a mold and cured by heat treatment to temperatures ranging from 110° C. to 170° C. for time intervals ranging from one minute to several hours depending upon the temperature and the sulfurization aid present.

However, it is found that none of these polymers will retain their molecular weight indefinitely during storage, and during extended mechanical working and processing. Instead a substantial breakdown and loss of molecular weight tend to occur during storage and processing in the unprotected polymer, which breakdown is largely prevented by the composition of the present invention.

The preferred embodiment of my invention utilizes as the protective agent para-hydroxy phenyl morpholine which is a substituted secondary amine sold under the trade name of "Solux" and has the formula:

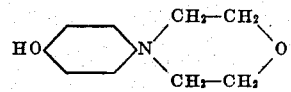

This substance may be identified as an inert, molecular weight breakdown inhibitor which may safely be used especially where the protected polymer is to be combined with rubber and the rubber vulcanized or is to be used in the making of impregnated fabrics for rubberized cloth, raincoats or other material where the poisoning effect of tertiary amyl phenol sulfide and other analogous substances makes them undesirable.

EXAMPLE 1

Isobutylene in the proportion of 100 parts was mixed with liquid ethylene in the proportion of 300 parts, and the resulting mixture at a temperature of approximately −98° C. was polmerized by the addition thereto of approximately 15 parts by weight of gaseous boron trifluoride. The resulting polymer was warmed up to room temperature and washed in a Werner-Pfleiderer type of kneader with warm water to remove traces of the catalyst. The resulting polymer had a molecular weight of approximately 65,400. To the washed material, during drying, there was added approximately 0.1% of the above mentioned parahydroxy phenyl morpholine and the polymer material as so protected was subject to a heat treatment consisting of storage at a temperature of 300° F. Another portion of the material was extruded by a worm type extruder into a solid coherent strip of polymer and samples of the extruded material were likewise given the same heat treatment. The results are shown in the following table:

Table A

| Sample | Initial mol. wt. | Mol. wt. 4 hrs. 300° F. | Mol. wt. 7 hrs. 300° F. | Per cent loss or gain in mol. wt. |
|---|---|---|---|---|
| Uninhibited | 65,400 | 40,800 | 34,800 | 46.7% loss. |
| 0.1% "Solux" after drying. | 66,000 | 67,600 | 74,400 | 12.3% gain. |
| 0.1% "Solux" after extrusion. | 64,800 | 66,000 | 68,400 | 5.4% gain. |

The above table shows the use of morpholine "Solux" in 0.1% ratio on the polymer. It is not, however, necessary that it be limited to such small proportions, but it is useful in relatively larger proportions, as shown by the following table B:

Table B

| Sample | Initial mol. wt. | Mol. wt. 4 hrs. 300° F. | Mol. wt. 7 hrs. 300° F. |
|---|---|---|---|
| 0.1% "Solux" | 85,500 | 86,000 | 85,000 |
| 0.2% "Solux" | 87,000 | 87,000 | 83,000 |
| 0.3% "Solux" | 88,000 | 85,000 | 82,000 |

Thus the above tables show that within the unavoidable errors of determination of molecular weight, the presence of morpholine, to all intents and purposes, completely avoids all molecular weight breakdown.

Thus the presence of this morpholine compound wholly avoids all loss in molecular weight. Table B above indicates a gain in molecular weight. It is not, however, positively known whether this apparent gain in molecular weight is an actual gain, or whether it is due to errors in sampling or in determination of the molecular weight. In any event, it is clear that the material substantially avoids all loss in molecular weight in the polymer and the morpholine compound is therefore a unique protective substance, since no previous protective agent has been found, which would wholly avoid all loss of molecular weight during heating and storage.

In the above examples there are used only the substituted secondary amines, but the effect is not unique to these secondary amines, since the primary and tertiary amines and derivatives thereof as well as the secondary amines and derivatives are similarly effective in varying degrees.

Example 2

The invention is not limited to the simple polymers of isobutylene, but is effective also with the mixed polymers or copolymers or interpolymers of iso-olefins and di-olefins.

A mixture was prepared consisting of 80 parts of isobutylene, 20 parts of butadiene and 300 parts of liquid ethylene. The resulting mixture has a temperature at atmospheric pressure of approximately −98° C. A catalyst consisting of a solution of aluminum chloride in methyl chloride was sprayed over the rapidly stirred olefinic mixture and the desired interpolymer quickly appeared. The resulting polymer was then treated with approximately 25 parts of isopropyl alcohol to quench the catalyst, and the solid polymer was warmed to room temperature and washed to remove residual portions of the catalyst decomposition substance and other substances. The resulting polymer was then compounded in the kneader as before with 0.1% of its weight of the para-hydroxy phenyl morpholine as before and the resulting protected polymer was found to be similarly stable to heat as well as to milling and other processing treatments.

The protected polymer was thereafter combined with sulfur and other substances according to the sub-joining recipe:

| | Parts |
|---|---|
| Isobutylene-diolefin polymer (containing 0.1 part "Solux") | 100 |
| Sulfur | 3 |
| Stearic acid | 5 |
| Zinc oxide | 5 |
| Tuads (tetra-methyl thiuram disulfide) | 1 |

This mixture was prepared by milling the polymer for a short time on the open roll mill and thereafter adding the suggested substances in the order indicated up to the Tuads. At this stage the material was cooled, the Tuads added rapidly and mixed in as quickly as possible and the material removed from the mill and brought quickly to room temperature. Thereafter the material was placed in a mold and cured at a temperature of approximately 155° C. for a time interval ranging from 15 minutes to 60 minutes according to the quantity of polymer being cured and the degree of cure desired. When so cured the material was found to have an elastic limit, an elongation of approximately 1200%, a tensile strength of approximately 4000 pounds and a high resistance to flexure and abrasion. In comparison to material compounded and cured similarly without the "Solux," the molecular weight of the material was found to be higher, and the physical characteristics of the cured material equal to or superior to those of the unprotected material.

Example 3

A considerable number of analogous substances tested in similar simple polymer of isobutylene with the results indicated in the sub-joining table:

| Sample | Initial mol. wt. | Mol. wt. 7 hrs.-300° F. | Per cent loss mol. wt. |
|---|---|---|---|
| Blank | 79,000 | 38,500 | 51.3 |
| Blank+0.1% phenyl alpha naphthylamine | 71,500 | 70,000 | 2.1 |
| Blank+0.1% phenylenediamine | 71,500 | 69,200 | 3.2 |
| Blank+0.1% mixed isopropoxy diphenylamine, diphenyl p-phenylenediamine, phenyl beta naphthylamine | 73,000 | 70,400 | 3.5 |
| Blank+0.1% phenyl beta naphthylamine | 69,200 | 65,200 | 5.7 |

Thus a substantial number of substituted amines are found to have very substantial protective and stabilizing effect upon the molecular weight of olefinic polymer substances.

Example 4

A polymer was prepared closely similar to that of Example 2; a mixture being made up consisting of 98.5 parts of isobutylene, 1.5 parts of isoprene, and an excess of crushed solid carbon dioxide. The mixture was stirred vigorously and, when it had reached a temperature of approximately −78° C., a substantial quantity of catalyst in the form of a solution of aluminum chloride in methyl chloride was mixed with the olefinic material, the mixing being accomplished by a vigorous and powerful stirring action.

The polymerization reaction proceeded quickly to yield a solid polymer having a molecular weight of approximately 35,000. The solid polymer with residual qualities of solid carbon dioxide and catalyst solvent was then dumped into warm water to volatilize $UCO_2$, all of the unpolymerized olefinic material and the catalyst solvent, and the solid polymer was then washed on the open roll mill to remove as much as possible of the catalyst and other residual materials. A portion of this polymer was then compounded according to the recipe given in Example 1, and the material was found to have a good tensile strength, good elongation, and other valuable and important properties. Another portion of the polymer was compounded with the morpholine substance of the present invention, and set aside for storage; and a third portion was set aside for storage without compounding with morpholine. At the end of a considerable number of weeks, both of the portions which had been set aside for storage were compounded according to the recipe given in Example 1, cured as before, and their tensile strengths and other properties determined. The sample containing morpholine was found to yield values substantially the same as those obtained on the fresh polymer, compounded and cured immediately upon production; whereas, the stored sample containing no morpholine yielded a cured material of relatively very low tensile strength and poor properties generally.

These results showed the very substantial and valuable protective effect of the morpholine upon the polymer after prolonged storage.

This protective effect is particularly valuable and useful with the plastic, elastic type of polymer, but it is not limited thereto, since the heavy oil type of polymer is equally well protected and the similar resin type polymer is similarly protected. Thus the invention consists of the combination of steps of polymerizing iso-olefin with or without an auxiliary modifying olefin or diolefin by the use of a Friedel-Crafts type catalyst at low temperature and the incorporation into the polymer of a substituted amine to protect and preserve the molecular weight; and in the polymer containing such a protective substance.

This application is in part a continuation of my prior filed application, Serial 352,743 filed August 15, 1940.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

What is claimed is:

1. In combination, an isobutylene-diolefin polymer characterized by a molecular weight within the range of 10,000 to 250,000, prepared from a major proportion of isobutylene and a minor proportion of a diolefin by a low temperature polymerization with a Friedel-Crafts catalyst within the temperature range below 0° C. to approximately −100° C., in combination with a molecular weight protective agent comprising para-hydroxy phenyl morpholine.

2. In combination, an isobutylene-diolefin polymer characterized by a molecular weight within the range of 10,000 to 250,000, prepared from a major proportion of isobutylene and a minor proportion of a diolefin by a low temperature polymerization with a Friedel-Crafts catalyst within the temperature range below 0° C. to approximately −100° C., in combination with a molecular weight protective agent comprising a substituted phenyl amine.

3. In combination an isobutylene-diolefin polymer characterized by a molecular weight within the range of 10,000 to 250,000 prepared from a major proportion of isobutylene and a minor proportion of a diolefin by a low temperature polymerization with a Friedel-Crafts catalyst at approximately −98° C. together with a molecular weight protective agent comprising para-hydroxy phenyl morpholine.

4. In combination an isobutylene-diolefin polymer characterized by a molecular weight within the range of 10,000 to 250,000 prepared from a major proportion of isobutylene and a minor proportion of a diolefin by a low temperature polymerization with a Friedel-Crafts catalyst at approximately −98° C. together with a molecular weight protective agent comprising a substituted phenyl amine.

5. In combination an isobutylene-butadiene polymer characterized by a molecular weight within the range of 10,000 to 250,000 prepared from a major proportion of isobutylene and a minor proportion of butadiene by a low temperature polymerization with a Friedel-Crafts catalyst at approximately −98° C. together with a molecular weight protective agent comprising para-hydroxy phenyl morpholine.

6. In combination an isobutylene-isoprene polymer characterized by a molecular weight within the range of 10,000 to 250,000 prepared from a major proportion of isobutylene and a minor proportion of isoprene by a low temperature polymerization with a Friedel-Crafts catalyst at approximately −98° C. together with a molecular weight protective agents comprising para-hydroxy phenyl morpholine.

7. In combination an isobutylene-di-methyl butadiene polymer characterized by a molecular weight within the range of 10,000 to 250,000 prepared from a major proportion of isobutylene and a minor proportion of di-methyl butadiene by a low temperature polymerization with a Friedel-Crafts catalyst at approximately −98% C. together with a molecular weight protective agent comprising para-hydroxy phenyl morpholine.

8. A process for stabilizing an iso-olefin-diolefin interpolymer prepared from a major proportion of isobutylene with a minor proportion of a diolefin by cooling the mixed olefins to a temperature within the range of 0° C. to −150° C. and polymerizing the mixture by the application thereto of a Friedel-Crafts catalyst dissolved in a low freezing, non-complex forming solvent comprising the steps of compounding the polymer with para-hydroxy phenyl morpholine.

9. A process for stabilizing an iso-olefin-diolefin interpolymer prepared from a major proportion of isobutylene with a minor proportion of a diolefin by cooling the mixed olefins to a temperature of approximately −98° C. and polymerizing the mixture by the application thereto of a Friedel-Crafts catalyst dissolved in a low freezing, non-complex forming solvent comprising the steps of compounding the polymer with para-hydroxy phenyl morpholine.

10. A process for stabilizing an iso-olefin-diolefin interpolymer prepared from a major proportion of isobutylene with a minor proportion of a diolefin by cooling the mixed olefins to a temperature within the range of 0° C. to −150° C. and polymerizing the mixture by the application thereto of a Friedel-Crafts catalyst dissolved in methyl chloride comprising the steps of compounding the polymer with para-hydroxy phenyl morpholine.

11. A process for stabilizing a cured iso-olefin-diolefin interpolymer prepared from a major proportion of isobutylene with a minor proportion of a diolefin by cooling the mixed olefins to a temperature within the range of 0° C. to −150° C. and polymerizing the mixture by the application thereto of a Friedel-Crafts catalyst dissolved in a low freezing, non-complex forming solvent comprising the steps of compounding the polymer with para-hydroxy phenyl morpholine and thereafter curing the polymer by the application thereto of heat and pressure.

12. A process for stabilizing a cured iso-olefin-diolefin interpolymer prepared from a major proportion of isobutylene with a minor proportion of a diolefin by cooling the mixed olefins to a temperature of approximately —98° C. and polymerizing the mixture by the application thereto of a Friedel-Crafts catalyst dissolved in a low freezing, non-complex forming solvent comprising the steps of compounding the polymer with para-hydroxy phenyl morpholine and thereafter curing the polymer by the application thereto of heat and pressure.

13. A process for stabilizing a cured iso-olefin-diolefin interpolymer prepared from a major proportion of isobutylene with a minor proportion of a diolefin by cooling the mixed olefins to a temperature within the range of 0° C. to —150° C. and polymerizing the mixture by the application thereto of a Friedel-Crafts catalyst dissolved in methyl chloride comprising the steps of compounding the polymer with para-hydroxy phenyl morpholine and thereafter curing the polymer by the application thereto of heat and pressure.

14. In combination an isobutylene polymer characterized by a molecular weight within the range of 10,000 to 250,000 prepared from isobutylene by a low temperature polymerization with a Friedel-Crafts catalyst at approximately —98° C. together with a molecular weight protective agent comprising para-hydroxy phenyl morpholine.

15. In combination an isobutylene polymer characterized by a molecular weight within the range of 10,000 to 250,000 prepared from isobutylene by a low temperature polymerization with a Friedel-Crafts catalyst within a temperature range between 0° C. and —164° C. together with a molecular weight protective agent comprising para-hydroxy phenyl morpholine.

WILLIAM J. DALY.